Oct. 25, 1966   R. D. COLE ETAL   3,280,471
APPARATUS AND PROCESS FOR FREEZE DRYING
Filed Nov. 23, 1964
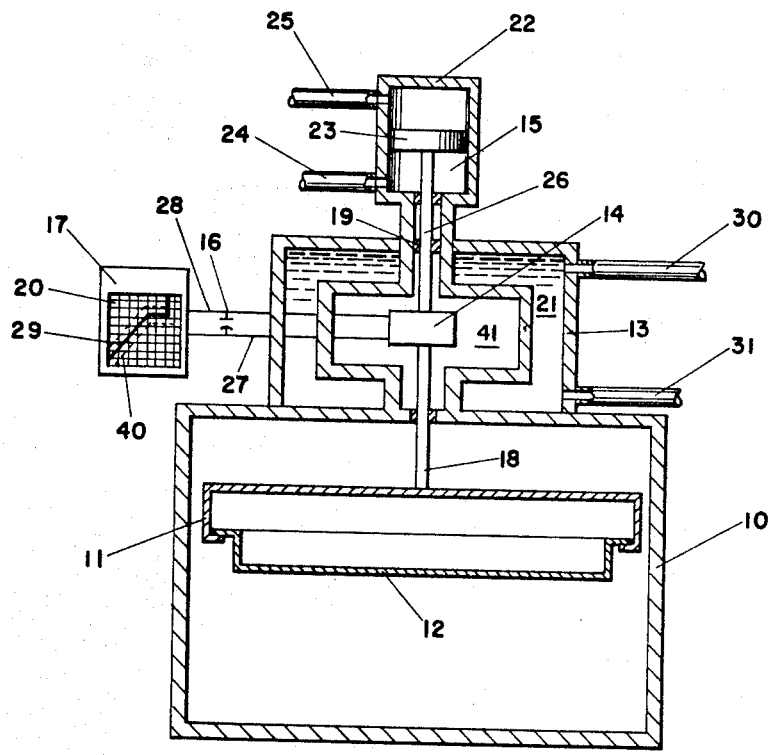
INVENTORS
ROBERT D. COLE
ROBERT R. GIDNER
AUSTIN W. REICHERT
BY
Charles L. Lovercheck
attorney 3,280,471
APPARATUS AND PROCESS FOR
FREEZE DRYING
Robert D. Cole, Erie, Robert R. Gidner, Fairview, and Austin W. Reichert, Erie, Pa., assignors to American Sterilizer Company, Erie, Pa., a corporation of Pennsylvania
Filed Nov. 23, 1964, Ser. No. 413,102
6 Claims. (Cl. 34—5)

This invention relates to freeze dry equipment and, more particularly, to controls for determining the extent of drying the material in a freeze dry chamber.

In the apparatus disclosed herein, a freeze dry chamber is provided which is subject to rapid temperature changes from −50° C. to +200° C. Load cells may be obtained and temperature compensation built into them; however, these load cells will function properly only if temperature changes are very gradual. Therefore, it became necessary to provide a system which would operate accurately during the rapid changes of temperature encountered.

In the structure disclosed, a load cell is contained in the small water jacket chamber attached immediately above the freze dry chamber with a rod made of a low heat conductivity material passing into the freeze dry chamber. Water is passed through the water jacketed chamber. This water jacket maintains the load cell at a constant temperature and shields it from radiant conduction, and convection heat since the heat which might otherwise pass through a load cell is absorbed and carried away by the water in the jacket. The low conductivity rod conducts little or no heat from the chamber to the load cell.

A second aspect of the invention concerns effectively eliminating all mechanical vibrations transmitted to the load suspended in the freeze dry chamber. These vibrations are picked up and transmitted to the indicator or recording instrument and result in variable electrical signals. These variable signals ordinarily appear on the load chart as a wide line which is difficult to interpret. By connecting an electrical condenser across the output electrical lines, the electrical signal from the load cell is averaged and the system then performs as if no mechanical vibrations were present.

It is, accordingly, more specifically an object of the invention to provide an improved process for measuring the level of moisture removal from a product in a freeze dry chamber.

Another object of the invention is to provide an improved supporting arrangement for measuring the moisture removal from a product in a freeze dry process.

A further object of the invention is to provide an improved recording apparatus in combination with a freeze dry arrangement.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

The drawing shows a view of a freeze dry chamber with the improved load support and recording arrangement supported thereon.

Now with more particular reference to the drawing, a freeze dry controlled chamber 10 is shown of a conventional low temperature insulated design such as frequently is used in low temperature work and it is provided with means which makes it capable of being reduced to a minimum temperature of approximately −50° centigrade. The chamber will be provided with suitable refrigeration equipment, evacuating equipment, and other accessories which are faimilar to those skilled in the art.

A rack 11 supports the trays 12 which may contain the product to be freeze dried. The rack 11 is supported by the low conductivity rod 18 which passes through a vacuum seal 19 at the top of the pressure and temperature controlled freeze dry chamber.

Supported on top of the freeze dry chamber 10 is the water containing chamber 13 which contains an inlet pipe 30 and an outlet pipe 31 for circulating water 21 through the chamber. The water chamber 13 has the hydraulic cylinder 22 supported on it and this cylinder has a piston 23 reciprocably supported therein. The piston 23 in the cylinder may be actuated by air admitted below the piston in line 24 and exhausted from above the piston from line 25. Thus, the piston can be moved up and down to lift the rack 11 so that the rack is supported by the low conductivity rod 18 through the load cell 14 and the piston rod 26. The load cell 14 is disposed in water jacketed chamber 41.

The load cell 14 is of the conventional type of strain gauge load cells which may be connected through suitable electrical wires 27 and 28 to the recording instrument 17.

The recording instrument 17 is of the type of strip chart recorders or other continuous recording or indicating instruments familiar to those skilled in the art. Thus, the recorder or indicator 17 will provide a line 29 on the chart 20 or indication on an indicating type meter.

Due to mechanical vibration of the chamber, the line 29 will be wide as at 40 as indicated by the dotted line. It has been discovered that this line will be of reduced width when a capacitor 16 is connected across the lines 27 and 28. If an indicating type instrument is used, the capacitor will reduce the fluctuations of the indicating pointer.

In carrying out the process disclosed herein, the operator will place the product to be dried on the tray 12 on the rack 11. He will then admit air pressure or other fluid in the line 24 which will lift the rack through the low conductivity rod 18, load cell 14, and piston rod 26 so that the weight of the rack, product, and tray is supported on the load cell. The strain gauge type load cell 14 will thus transmit a signal to the recorder 17. Then as the goods is dried, the recorder will indicate a line such as the inclined portion of the line 29 and when the moisture has been removed from the goods, this line will flatten out. At the time that the line flattens out, the operator will be thus informed that the goods are dry.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a freeze dry arrangement comprising a water jacketed, temperature controlled chamber and a pressure controlled chamber,
    said water jacketed chamber supported on said controlled chamber,
    a load cell in said water jacketed chamber,
    a rack in said controlled chamber for supporting a product to be dried,
    a low conductivity rod attached to said load cell and extending into said controlled chamber and attached to said rack, means to lift said load cell whereby said rack may be supported from said load cell, and a recording or indicating instrument attached to said load cell for recording or indicating the weight of said rack continuously over a period of drying whereby the change of weight of said rack and product thereon may be observed.

2. The method of determining the extent of moisture removed from a product in a freeze drying process comprising providing a temperature controlled chamber at substantially −50° C. to 200° C., placing said product in said chamber, supporting said product in said chamber on a weighing device, and observing the weight of said product for a period of time whereby the time when the weight of said product becomes constant will indicate that a predetermined level of moisture in said product has been reached.

3. The method recited in claim 2 wherein a continuous record of said weight is made.

4. An apparatus for freeze drying comprising a chamber, means to control the temperature of the inside of said chamber, support means in said chamber to support a product to be dried, said support means in said chamber comprising a tray, a load cell attached to said tray, lift means to lift said load cell whereby said tray is supported by said load cell, and a recording or indicating instrument connected to said load cell for continuously recording the weight of said tray and a product thereon whereby the weight of said product can be observed and the moisture content of said product can be determined.

5. The apparatus recited in claim 4 wherein a container comprising a water jacket is supported on said chamber, a load cell is disposed in said container in said water jacket, and a supply of water is connected to said container whereby said load cell will be held at constant temperature.

6. In combination, a freeze dry chamber, a load cell on said chamber, and a water jacketed chamber, said load cell being disposed in said water jacketed chamber, and means connected to said load cell for supporting a product in said chamber, an electric recorder connected to said load cell by electrical lines, and an electrical condenser connected across said lines for eliminating the effect of signals due to mechanical vibration therefrom.

References Cited by the Examiner

UNITED STATES PATENTS

| | | | |
|---|---|---|---|
| 3,081,831 | 3/1963 | Thorsson | 177—5 |
| 3,145,562 | 8/1964 | Hamilton | 34—5 |
| 3,169,049 | 2/1965 | Reiy | 34—5 |
| 3,176,408 | 4/1965 | Fuentevilla | 34—5 |
| 3,178,829 | 4/1965 | Cox | 34—5 |

WILLIAM J. WYE, *Primary Examiner.*